US006199253B1

(12) United States Patent
Snowden

(10) Patent No.: US 6,199,253 B1
(45) Date of Patent: Mar. 13, 2001

(54) VALVE SPRING REMOVAL AND INSTALLATION TOOL

(76) Inventor: Milton R. Snowden, 823 Riverside Dr., Russell, KY (US) 41169

( * ) Notice: Subject to any disclaimer, the term of this patent is extended or adjusted under 35 U.S.C. 154(b) by 0 days.

(21) Appl. No.: 09/371,551

(22) Filed: Aug. 10, 1999

(51) Int. Cl.7 ...................... B23P 19/04
(52) U.S. Cl. ...................... 29/220
(58) Field of Search ...................... 29/219, 220, 267; 259/25, 131

(56) References Cited

U.S. PATENT DOCUMENTS 2,427,045 * 9/1947 Cook ...................... 29/219
4,567,634 * 2/1986 Landry ...................... 29/220

* cited by examiner

*Primary Examiner*—Robert C. Watson
(74) *Attorney, Agent, or Firm*—Hendrickson & Long; Stephen M. Schwartz

(57) ABSTRACT

The present invention is a tool for removing and installing valve springs on an internal combustion engine, said tool having a body with a pair of prongs at one end and a handle means for supplying a downward force at the other end. At the extreme end of the pair of prongs is a rotatably mounted shaft which has a centrally located bore, the axis of which is perpendicular to the axis of the shaft. The bore is positioned about a rocker arm stud or bolt corresponding to the valve spring to be worked upon. Located at the top of the bore is a flat face which engages a nut placed on a rocker arm stud or the underside of the bolt head of the rocker arm bolt. The tool is then centrally positioned over the valve stem such that the prongs engage the valve spring keeper. As a downward force is applied to the body member, the prongs compress the valve spring and allow the removal or installation of the valve spring keeper lock.

2 Claims, 2 Drawing Sheets

VALVE SPRING REMOVAL AND INSTALLATION TOOL

CROSS REFERENCE TO RELATED DOCUMENTS

The present invention relates to Disclosure Document Number 442455 filed with the United States Patent & Trademark Office on Aug. 10, 1998.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The present invention involves a new and improved method of removing and installing valve springs, particularly for use on internal combustion engines with a rocker arm stud or bolt located adjacent to the valve spring.

Internal combustion engines generally use a plurality of valves on each cylinder to provide means for introducing a fuel-air mixture into the cylinder and means for exiting exhaust gases after combustion. Typically, these valves are mounted on the cylinder head and consist of a valve face which extends into the cylinder and a valve stem which extends through and above the cylinder head. A valve spring is positioned about the valve stem above the cylinder head. The valve spring is held under a compression load by means of a valve spring keeper and a valve spring keeper lock which engages the valve stem thereby holding the valve in a raised and therefore closed position. In operation, the valve is reciprocated thousands of times per minute by means of a rocker arm pivotally mounted on a rocker arm stud or bolt. One end of the rocker arm engages the top of a push rod linearly positioned opposite the rocker arm stud or bolt from the valve stem. The other end of the rocker arm engages the top of the valve stem. As the push rod pivots the rocker arm, the rocker arm reciprocates the valve by alternately pushing down upon the valve stem, thereby further compressing the valve spring, and then releasing this downward force, thereby allowing the valve spring to return the valve to the closed position. It is this reciprocating motion of the valve which causes wear and failure of the component parts of the valve assembly often requiring the removal and installation of the valve spring to make the necessary repairs.

While the prior art discloses various tools for the removal and installation of valve springs, most tend to be complex, of limited application, require the removal of additional component parts of the engine, may cause damage to other component parts of the engine or any combination thereof. U.S. Pat. No. 3,363,302 issued to Haselmo on Jan. 16, 1968, and U.S. Pat. No. 4,567,634 issued to Landry on Feb. 4, 1986, both rotate using a part of the engine assembly, particularly a rocker arm stud, as the pivot point. This pivot action subjects the rocker arm stud to rotational forces it was not designed to carry, as well as sliding the inside edge of the tool over the rocker arm stud threads as the tool is rotated, any of which may cause damage to the rocker arm stud and/or the rocker arm stud threads. It is a further disadvantage of these tools that other component parts of the engine will interfere with the operation of the tool, specifically the push rod corresponding to the valve spring being worked upon must be removed or the engine rotated to lower such push rod to provide sufficient clearance for the tool to operate and, in the case of the Landry tool, all rocker arms in front of the valve spring being worked upon must be removed to provide the necessary clearance.

U.S. Pat. No. 5,689,870 issued to Robey on Nov. 25, 1997, uses the push rod as the pivot point to compress the valve spring. This requires the engine to be rotated such that the push rod is placed in the optimum position for the tool to operate. It is a further disadvantage of this tool that, as the valve spring is compressed, the threads on the rocker arm stud are subjected to both sheer and rotational forces as the crank down nut is rotated against the force of the valve spring thereby creating the possibility of damage to such threads. In addition, in the event that the operator should leave the tool with the valve spring in the compressed position for an extended period of time, the constant force transmitted through the push rod to a hydraulic lifter, as most engines are so equipped, may cause oil to bleed from the hydraulic lifter thereby creating the potential for internal damage to the engine when it is next started. Finally, this tool is not adaptable for use with high performance valve springs which are significantly longer than standard valve springs and may not be used with the cylinder head removed from the engine.

U.S. Pat. No. 5,349,732 issued to Spence on Sep. 27, 1994, discloses a locking jaw plier-like tool. The length of this tool may require other significant component parts of the engine to be removed before the tool can be utilized while the cylinder head is mounted on the engine such as, depending upon the particular installation, the intake manifold, the power steering pump, the alternator or some other significant component part. In addition, this tool would subject the rocker arm stud to certain rotational forces thereby creating the possibility of bending the rocker arm stud. Finally, this tool discloses interchangeable jaws to fit various applications thereby increasing the complexity and cost of the tool as a whole.

U.S. Pat. No. 4,262,403 issued to Wilhelm and Bellino on Apr. 21, 1981, and U.S. Pat. No. 4,780,941 issued to Tucker on Nov. 1, 1988, both disclose complex, and therefore expensive, tools of limited application. Both of these tools may be used only with rocker arm studs and therefore could not be used on applications utilizing rocker arm bolts. It is a further disadvantage of the Wilhelm/Bellino tool that it is not adjustable for different spring heights and therefore will not work with high performance valve springs. It is a further disadvantage of the Tucker tool that it will be very slow in compressing the valve spring and further, do to certain rotational loads, may cause damage to the rocker arm stud.

Thus, there is a need for a simple and inexpensive tool which can quickly and easily remove and install valve springs on a wide variety of valve spring applications and which requires removal of only the minimum component parts of an engine to be used.

BRIEF SUMMARY OF THE INVENTION

The present invention provides a simple and inexpensive tool for the removal and installation of valve springs on an internal combustion engine without the need for removing more than a minimum number of component parts and without the possibility of causing damage to other component parts of the engine. The tool involves a body member having a pair of prongs at one end. Rotatably mounted between the pair of prongs is a shaft having a centrally located bore, the axis of which is perpendicular to the axis of the shaft. The bore has sufficient diameter to pass a rocker arm stud or bolt. At the top end of the bore is a flat face of sufficient dimensions to seat a nut mounted on a rocker arm stud or a bolt head on a rocker arm bolt. At the opposite end of the body member from the pair of prongs is a handle receiving means for mounting a removable handle means used to provide a force to the body member.

In practice, the valve cover is removed from the cylinder head where the valve spring to be worked upon is located and the corresponding rocker arm is removed. The corresponding rocker arm stud or bolt is passed through the bore in the rotatable shaft and, in an application using a rocker arm stud, a nut is rotated onto the rocker arm stud threads, or, in an application using a rocker arm bolt, the bolt is rotated into the cylinder head in its operating location, thereby securing the tool to the cylinder head. The tool may be set at the optimum position above the cylinder head for a particular valve spring application by adjusting the height of said nut or bolt head. The tool is then positioned with the valve stem centrally located under and between the pair of prongs. A downward force is then applied by the handle means thereby compressing the valve spring. Once sufficient clearance has been obtained, the valve spring keeper lock can be removed. The downward force can then be released thereby releasing the valve spring. Installation of the valve spring is accomplished by performing the steps outlined above in reverse order.

While not a part of the present invention, those skilled in the art must understand the need to provide a means to prevent the valve from dropping through the cylinder head once the force of the valve spring and the valve spring keeper lock is removed.

DETAILED DESCRIPTION OF THE INVENTION

Figure 1:
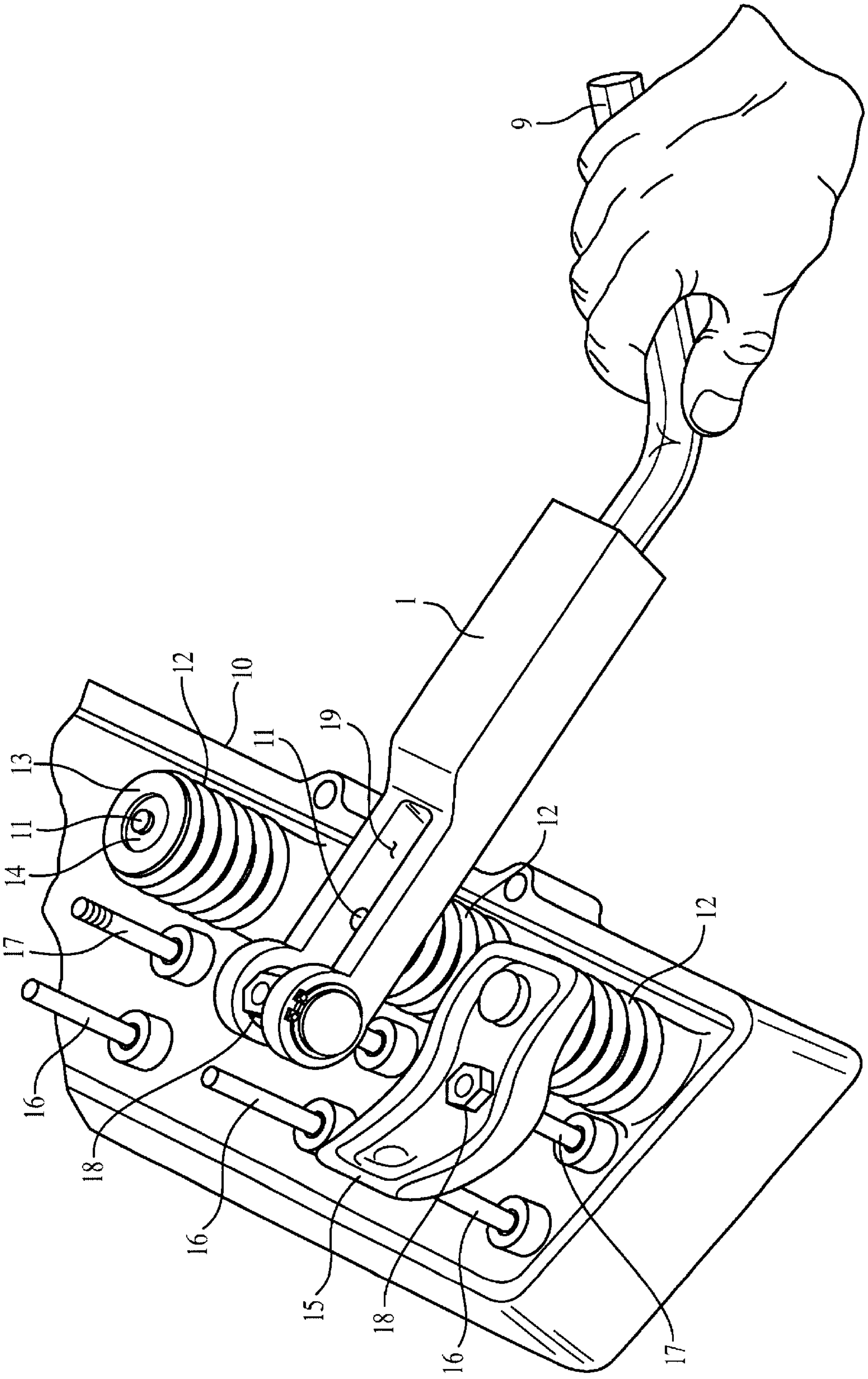
FIG. 1 is a partial view of a cylinder head with the attendant valve assembly component parts and the subject tool shown in the working position.

Referring to the drawings, FIG. 1 is a partial view of a cylinder head 10 with the exposed valve assembly including valve stem 11, valve spring 12, valve spring keeper 13, valve spring keeper lock 14, rocker arm 15, push rod 16 and rocker arm stud or bolt 17. The tool is secured to the cylinder head by passing rocker arm stud or bolt 17 through bore 5 in shaft 4 such that bolt head or nut 18 contacts flat face 6 at one end of bore 5. Body member 1 is then positioned such that aperture 19 is centrally positioned over valve stem 11 allowing prongs 2 and 2' to simultaneously engage valve spring keeper 13. A sufficient downward force is applied to body member 1 by means of handle 9 to compress valve spring 12. While valve spring 12 is held in the compressed position, valve spring keeper lock 14 may be removed or installed. When this procedure is accomplished, those skilled in the art must understand that a force must be applied to the underside of the valve, such as compressed air through the spark plug hole (not shown) to maintain valve stem 11 in an extended position while valve spring 12 is compressed.

Figure 2:
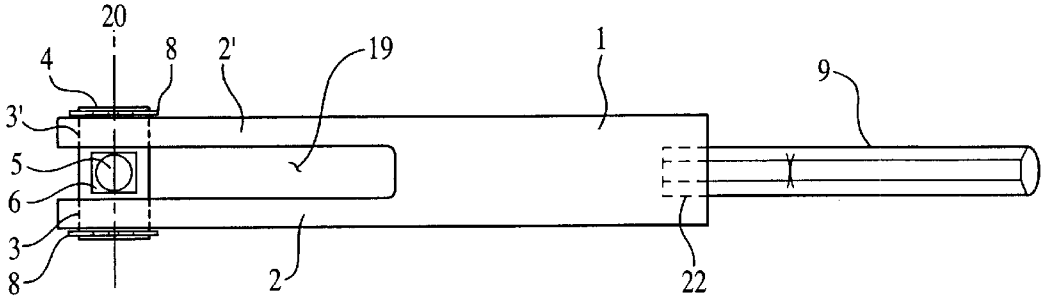
FIG. 2 is a top view of the subject tool.
Figure 3:
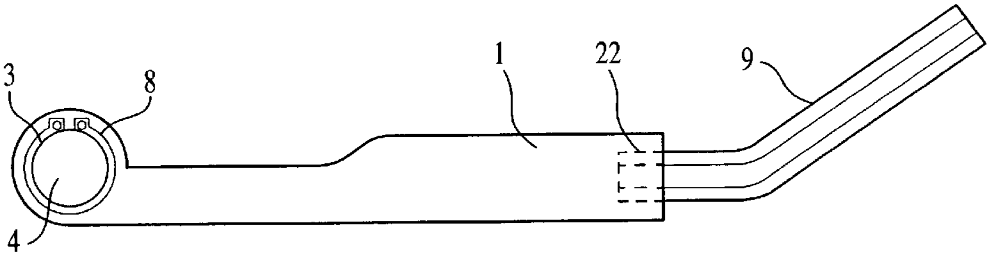
FIG. 3 is a side view of the subject tool.

As illustrated most clearly in FIG. 2 and FIG. 3, the tool includes body member 1, handle means 9 and shaft 4. On one end of body member 1 is located handle receiving means 22 for mounting handle means 9. On the other end of body member 1, opposite handle receiving means 22, is located a pair of prongs 2 and 2'. Near the extreme ends of prongs 2 and 2' are located bores 3 and 3', respectively, on common axis 20. Bores 3 and 3' have sufficient dimensions to coaxially receive shaft 4 which is rotatably mounted in bores 3 and 3' and held in position by retaining means 8 shown as a locking clip. Aperture 19 is formed by body member 1, the pair of prongs 2 and 2' and shaft 4.

Figure 4:
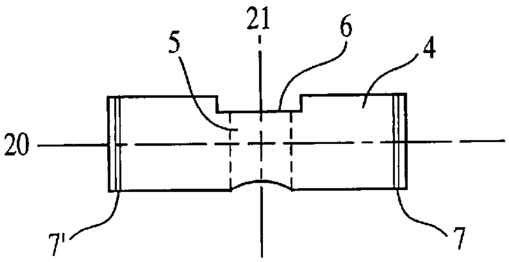
FIG. 4 is a detail side view of the rotatable shaft which is a part of the subject tool.

As illustrated most clearly in FIG. 4, shaft 4 includes bore 5, the axis 21 of which is perpendicular to axis 20. Bore 5 is centrally positioned on shaft 4 and has sufficient dimensions to pass rocker arm stud or bolt 17. Located at one end of bore 5 is flat face 6 which has sufficient dimensions to seat bolt head or nut 18. Also included on shaft 4 are retainer receiving means 7 and 7' on which are mounted retaining means 8.

I claim:

1. A tool for removing and installing a valve spring from an engine, said valve spring being held in position about a valve stem by a valve spring keeper lock, and there being a rocker arm stud or bolt adjacent to said valve spring, said tool comprising:

a. a body member having a pair of prongs on one end;

b. a shaft rotatably mounted between said pair of prongs;

c. a perpendicular bore in said shaft for receiving the rocker arm stud or bolt, said shaft and said pair of prongs being configured such that when a rocker arm stud or bolt is passed through said bore in said shaft, said pair of prongs centrally engage the valve spring with an opening sufficient to allow the valve spring keeper lock and valve stem to pass therethrough; and d. a means for applying a force to the body member sufficient to compress the valve spring.

2. A tool as recited in claim 1, wherein a flat face is positioned on said shaft at one end of said bore, said flat face being configured to seat a nut mounted on a rocker arm stud or a bolt head on a rocker arm bolt.

* * * * *